US012132775B2

(12) United States Patent
Ahn et al.

(10) Patent No.: US 12,132,775 B2
(45) Date of Patent: Oct. 29, 2024

(54) METHOD AND APPARATUS FOR PROVIDING METAVERSE ENVIRONMENT

(71) Applicant: Hyperconnect Inc., Seoul (KR)

(72) Inventors: Sang Il Ahn, Seoul (KR); Yoon Woo Jang, Seoul (KR); Dong Woo Kang, Seoul (KR); Ye Li Kim, Seoul (KR); Seo Hee Choi, Seoul (KR); Yae Jin Han, Seoul (KR); Sun Yeop Lee, Seoul (KR); Han Ryeol Seong, Seoul (KR); Eun Hee Choi, Seoul (KR); Dan Ha Kim, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/937,982

(22) Filed: Oct. 4, 2022

(65) Prior Publication Data

US 2023/0123698 A1    Apr. 20, 2023

(30) Foreign Application Priority Data

Oct. 15, 2021   (KR) .......................... 10-2021-0137236
Mar. 15, 2022  (KR) .......................... 10-2022-0032151

(51) Int. Cl.
*G06F 15/16* (2006.01)
*G06F 3/16* (2006.01)
(Continued)

(52) U.S. Cl.
CPC ................ *H04L 65/80* (2013.01); *G06F 3/16* (2013.01); *H04L 51/046* (2013.01); *H04L 65/1093* (2013.01); *H04M 3/563* (2013.01)

(58) Field of Classification Search
CPC ... H04L 65/80; H04L 51/046; H04L 65/1093; G06F 3/16; H04M 3/563
See application file for complete search history.

(56) References Cited

U.S. PATENT DOCUMENTS 10,489,445 B1 *  11/2019  Carter .................... G06V 20/30
11,463,657 B1 *  10/2022  Kasaba ................... G06T 13/40
(Continued)

OTHER PUBLICATIONS

Michelle Cyca; What is Clubhouse? Everything You Need to Know About the Audio App; Hootsuite; May 5, 2022; retrieved from https://blog.hootsuite.com/clubhouse-app/; 29 pages (Year: 2022).*

*Primary Examiner* — Oleg Survillo
(74) *Attorney, Agent, or Firm* — KPPB LLP

(57) ABSTRACT

The operating method of a server for providing a metaverse in which a call between user terminals may be performed may include: generating a first avatar based on profile information of a first user terminal and a second avatar based on profile information of a second user terminal; providing a map space in which the first avatar and the second avatar are able to travel; mediating a call between the first user terminal and the second user terminal based on whether a plurality of avatars including the first avatar and the second avatar have entered a first audio space included in the map space; and completing matching between the first user terminal and the second user terminal when a first sign of attraction to the second avatar is transmitted from the first user terminal and a sign of attraction to the first avatar is transmitted from the second user terminal.

11 Claims, 14 Drawing Sheets

(51) Int. Cl.
*H04L 51/046* (2022.01)
*H04L 65/1093* (2022.01)
*H04L 65/80* (2022.01)
*H04M 3/56* (2006.01)

(56) References Cited

U.S. PATENT DOCUMENTS

| | | | |
|---|---|---|---|
| 11,582,424 B1* | 2/2023 | Kasaba | G06V 40/174 |
| 2018/0309801 A1* | 10/2018 | Rathod | H04M 3/5175 |
| 2022/0321370 A1* | 10/2022 | Skuratowicz | H04L 12/1822 |
| 2023/0071584 A1* | 3/2023 | Lebeau | H04L 12/1822 |
| 2023/0090253 A1* | 3/2023 | Meadows | H04L 63/1483 |
| | | | 345/419 |
| 2023/0092103 A1* | 3/2023 | Puyol | H04S 7/304 |
| | | | 715/205 |
| 2023/0109377 A1* | 4/2023 | Arechiga | G06F 3/011 |
| | | | 345/419 |
| 2023/0120441 A1* | 4/2023 | Hopkins | G06F 21/606 |
| | | | 455/414.1 |
| 2023/0123698 A1* | 4/2023 | Ahn | A63F 13/79 |
| | | | 709/206 |
| 2023/0177777 A1* | 6/2023 | Bryant | G10L 13/02 |
| | | | 345/633 |

\* cited by examiner

METHOD AND APPARATUS FOR PROVIDING METAVERSE ENVIRONMENT

CROSS-REFERENCE TO RELATED APPLICATION

This application is based on and claims priority under 35 U.S.C. § 119 to Korean Patent Applications No. 10-2021-0137236, filed on Oct. 15, 2021, and No. 10-2022-0032151, filed on Mar. 15, 2022, in the Korean Intellectual Property Office, the present disclosure of which is incorporated by reference herein in its entirety.

BACKGROUND

1. Field

The present disclosure provides a method and apparatus for providing a metaverse environment in which a call between user terminals may be performed.

2. Description of the Related Art

Recently, augmented reality and mixed reality employing computer graphics techniques have been developed. Augmented reality and/or mixed reality refers to technology for overlapping computer-generated information with a real-world object, i.e., for allowing a user to interact in real time with a combination of the real world and a virtual world.

Representative services of providing augmented reality or mixed reality to users include a metaverse service. The term 'metaverse' is a compound word of 'meta' meaning 'virtual or abstract' and 'universe' meaning 'the real world', and refers to a three-dimensional virtual world.

The background technology described above is technical information that the inventor(s) of the present disclosure has achieved to derive the present disclosure or has achieved during the derivation of the present disclosure, and thus, it cannot be considered that the background technology has been published to the public before the filing of the present disclosure.

SUMMARY

The present disclosure provides a method and apparatus for providing a metaverse in which a call between user terminals may be performed.

Technical objects of the present disclosure are not limited to the foregoing, and other unmentioned objects or advantages would be understood more clearly from the embodiments of the present disclosure described below. In addition, it would be understood that the objects and advantages of the present disclosure may be realized by means and combinations thereof in the claims.

Additional aspects will be set forth in part in the description which follows and, in part, will be apparent from the description, or may be learned by practice of the presented embodiments of the present disclosure.

According to a first aspect of the present disclosure, an operating method of a server may include: generating a first avatar based on profile information of a first user terminal and a second avatar based on profile information of a second user terminal; providing a map space in which the first avatar and the second avatar are able to travel; mediating a call among a plurality of avatars including the first user terminal and the second user terminal based on whether the plurality of avatars including the first avatar and the second avatar have entered a first audio space included in the map space; and when a first sign of attraction to the second avatar is transmitted from the first user terminal and a sign of attraction to the first avatar is transmitted from the second user terminal, completing matching between the first user terminal and the second user terminal.

The completing of the matching may include mediating transmission and reception of messages between the first user terminal and the second user terminal.

The providing of the map space may include setting an entry condition for entering the first audio space, and the plurality of avatars including the first avatar and the second avatar may correspond to avatars satisfying the entry condition.

The entry condition may include at least one of a condition regarding ages of avatars to enter the first audio space, a condition regarding a gender ratio of avatars present in the first audio space, and a condition regarding a number of avatars present in the first audio space.

The map space may include at least one sub-map space, and the at least one sub-map space may correspond to a space configured based on information about real-world locations of user terminals.

According to a second aspect of the present disclosure, a computer program product may include one or more computer-readable recording media storing a program for performing: generating a first avatar based on profile information of a first user terminal and a second avatar based on profile information of a second user terminal; providing a map space in which the first avatar and the second avatar are able to travel; mediating a call between the first user terminal and the second user terminal based on whether a plurality of avatars including the first avatar and the second avatar have entered a first audio space included in the map space; and when a first sign of attraction to the second avatar is transmitted from the first user terminal and a sign of attraction to the first avatar is transmitted from the second user terminal, completing matching between the first user terminal and the second user terminal.

According to a third aspect of the present disclosure, an apparatus may include a memory storing at least one program, and at least one processor configured to execute the at least one program to generate a first avatar based on profile information of a first user terminal and a second avatar based on profile information of a second user terminal, provide a map space in which the first avatar and the second avatar are able to travel, mediate a call between the first user terminal and the second user terminal based on whether a plurality of avatars including the first avatar and the second avatar have entered a first audio space included in the map space, and when a first sign of attraction to the second avatar is transmitted from the first user terminal and a sign of attraction to the first avatar is transmitted from the second user terminal, complete matching between the first user terminal and the second user terminal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
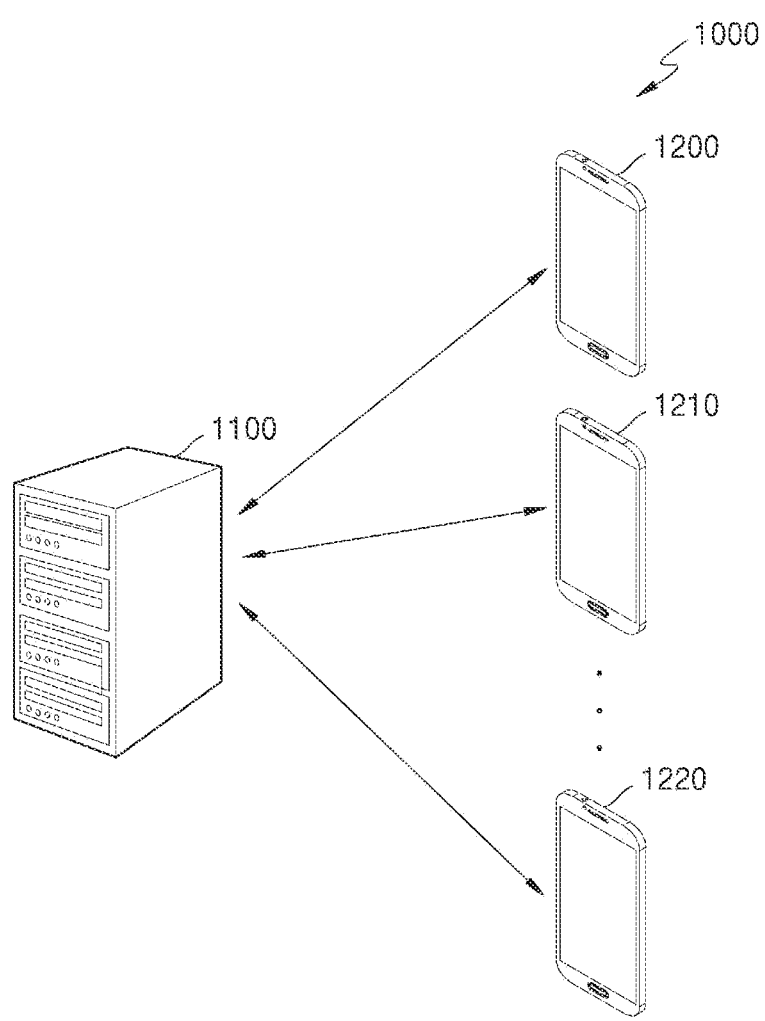
FIG. 1 is a diagram illustrating an example of a system including a server and at least one terminal.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Although the terms used in the present disclosure are selected from among common terms that are currently widely used in consideration of their function in the present disclosure, the terms may be different according to an intention of one of ordinary skill in the art, a precedent, or the advent of new technology. Also, in particular cases, the terms are discretionarily selected by the applicant of the present disclosure, in which case, the meaning of those terms will be described in detail in the corresponding part of the detailed description. Therefore, the terms used in the present disclosure are not merely designations of the terms, but the terms are defined based on the meaning of the terms and content throughout the present disclosure.

In the description of embodiments, it will be understood that when an element is referred to as being "connected to" another element, it may be "directly connected to" the other element and/or be "electrically connected to" the other element through an intervening element. In addition, when an element is referred to as "including" a component, the element may additionally include other components rather than excluding other components as long as there is no particular opposing recitation.

The terms such as "include" or "comprise" used herein should not be construed as necessarily including all various elements and/or operations described herein and should be understood that some of the elements and/or operations may be omitted or additional elements and/or operations may be further provided.

It should be understood that the scope of the embodiments is not limited by the description of certain embodiments below and matters that can be easily derived by those of ordinary skill in the art fall within the scope of the embodiments. Hereinafter, example embodiments will be described in detail with reference to the accompanying drawings.

FIG. 1 is a diagram illustrating an example of a system including a server and at least one terminal.

A system 1000 according to an embodiment may include a server 1100 and a plurality of user terminals 1200 to 1220 (hereinafter, also referred to as the first to third user terminals 1200 to 1220). Although FIG. 1 illustrates three user terminals 1200 to 1220 for convenience, the present disclosure is not limited thereto.

For example, the system 1000 may be capable of providing a metaverse in which a call between user terminals may be performed. In the metaverse, users using their terminals on the system 1000 may exchange images and voices with other users, and may also exchange texts with each other by using a chat function.

The server 1100 may provide the plurality of user terminals 1200 to 1220 with a virtual map space, and may mediate a call among the plurality of user terminals 1200 to 1220. In addition, the server 1100 may provide a mediation service to allow the plurality of user terminals 1200 to 1220 to transmit and receive data to and from each other. The server 1100 may transmit or receive data to or from the plurality of user terminals 1200 to 1220 through a network.

The server 1100 may receive profile information from each of the plurality of user terminals 1200 to 1220. The server 1100 may generate an avatar corresponding to each user terminal. The server 1100 may control the behaviors of avatars in the virtual map space based on input signals received from the plurality of user terminals 1200 to 1220, respectively.

A user of the first user terminal 1200 may execute an application provided by the server 1100, and the first user terminal 1200 may receive, from the server 1100, profile information of at least some users of other user terminals.

The server 1100 and the plurality of user terminals 1200 to 1220 may perform communication by using a network. For example, the network may include a local area network (LAN), a wide area network (WAN), a value-added network (VAN), a mobile radio communication network, a satellite communication network, or a combination thereof. The network can be a data communication network having comprehensive capabilities allowing each network constituent illustrated in FIG. 1 to seamlessly communicate with each other, and may include a wired Internet connection, a wireless Internet connection, and a mobile wireless communication network. In addition, examples of wireless communication may include, but are not limited to, a wireless LAN (e.g., Wi-Fi), Bluetooth, Bluetooth Low Energy, Zigbee, Wi-Fi Direct (WFD), ultra wideband (UWB), Infrared Data Association (IrDA), and near-field communication (NFC).

Each of the plurality of user terminals 1200 to 1220 may be, but is not limited to, a smart phone, a tablet personal computer (PC), a PC, a smart television (TV), a mobile phone, a personal digital assistant (PDA), a laptop, a media player, a microserver, a global positioning system (GPS)

device, an electronic book terminal, a digital broadcasting terminal, a navigation system, a kiosk, an MP3 player, a digital camera, a home appliance, a camera-mounted device, or other mobile or non-mobile computing device.

Figure 2:
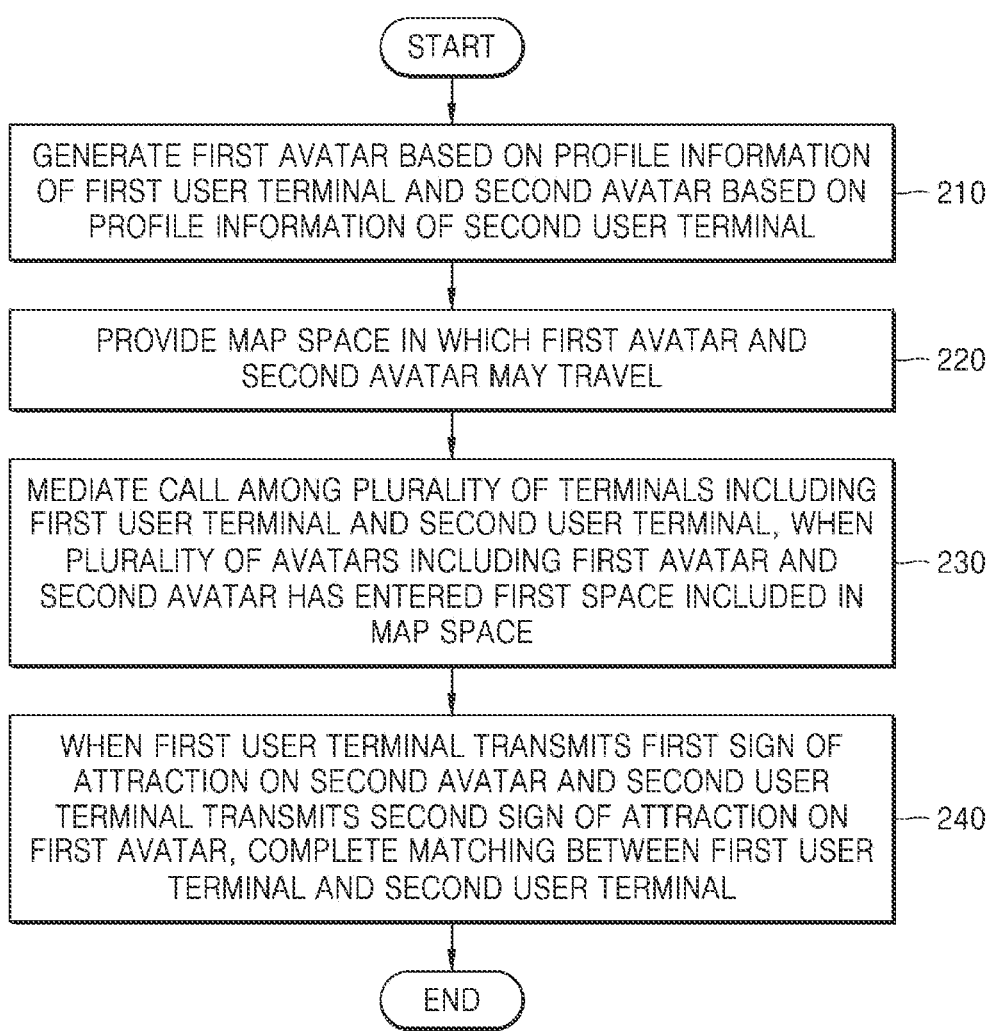
FIG. 2 is a flowchart of a method of providing a metaverse in which a call between user terminals may be performed, according to an embodiment.

FIG. 2 is a flowchart of a method of providing a metaverse in which a call between user terminals may be performed, according to an embodiment.

Referring to FIG. 2, in operation 210, the server 1100 may generate a first avatar based on profile information of a first user terminal and a second avatar based on profile information of a second user terminal.

Figure 3:
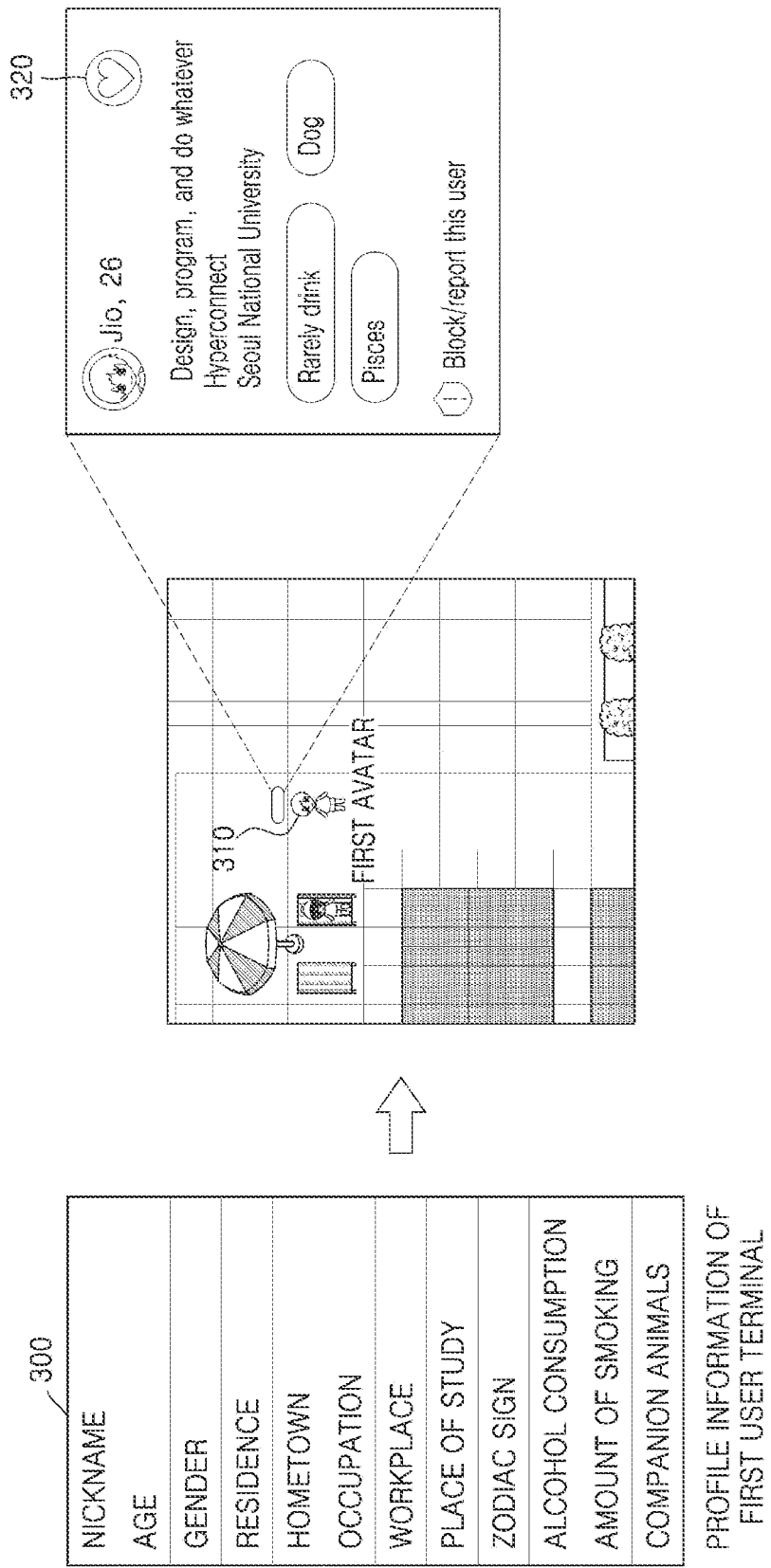
FIG. 3 is a diagram illustrating an example of an avatar and profile information according to an embodiment.

FIG. 3 is a diagram illustrating an example of an avatar and profile information according to an embodiment.

Referring to FIG. 3, the server 1100 may receive profile information 300 from the first user terminal 1200. The profile information 300 may include, but is not limited to, information about the user of the first user terminal 1200, for example, nickname, age, gender, residence, hometown, occupation, workplace, place of study, zodiac sign, alcohol consumption, amount of smoking, companion animals, etc.

In addition, the user of the first user terminal 1200 may select any one of various preset types of avatars. The server 1100 may receive information of the avatar selected by the first user terminal 1200.

The server 1100 may generate a first avatar 310 corresponding to the first user terminal 1200 based on the received profile information 300 of the first user terminal 1200 and the received information of the avatar selected by the first user terminal 1200.

The user of the first user terminal 1200 may click an entry button for entering a map space in which avatars may travel, and when the entry button is clicked, the first avatar 310 may enter the map space.

Meanwhile, the second user terminal 1210 or the third user terminal 1220 may transmit a sign of attraction to the first avatar 310. For example, when an object representing the first avatar 310 or a nickname on the object is clicked, the second user terminal 1210 or the third user terminal 1220 may receive the profile information 300 of the first user terminal 1200. The profile information 300 of the first user terminal 1200 may be displayed on the screen of the second user terminal 1210 or the screen of the third user terminal 1220, and the user of the second user terminal 1210 or the third user terminal 1220 may transmit a sign of attraction to the first avatar 310 based on the profile information 300 of the first user terminal 1200. For example, an attraction icon 320 may be displayed on the profile information 300 of the first user terminal 1200, and the user of the second user terminal 1210 or the third user terminal 1220 may click the attraction icon 320 to transmit a sign of attraction to the first avatar 310.

Referring back to FIG. 2, in operation 220, the server 1100 may provide a map space in which the first avatar and the second avatar may travel.

Figure 4:
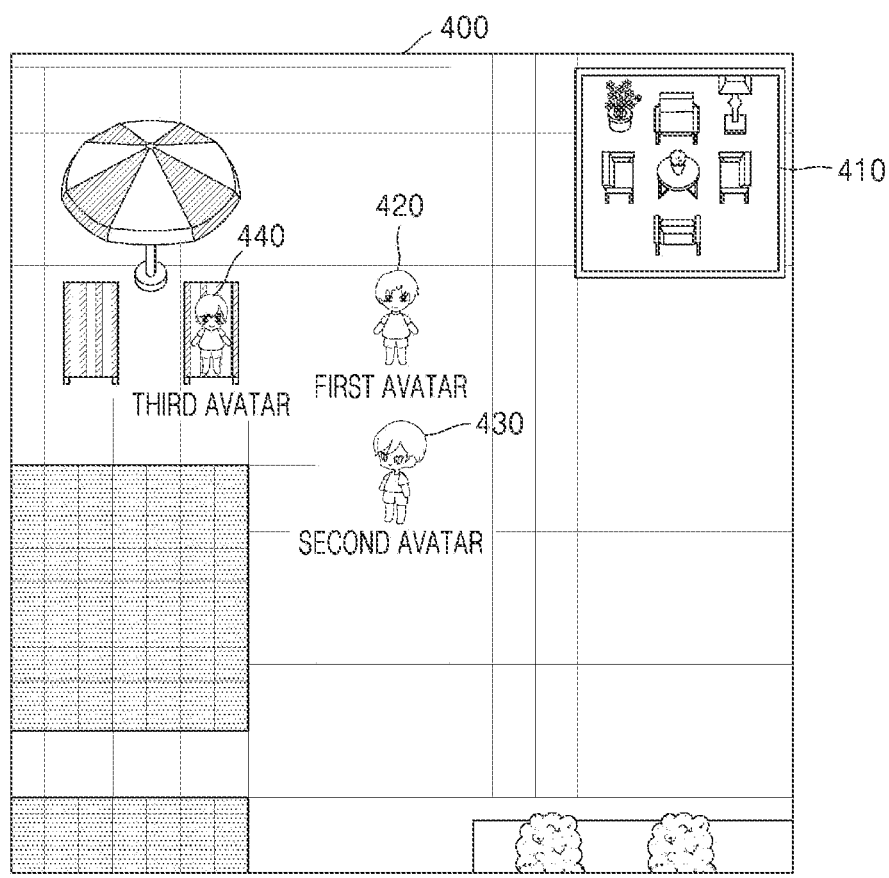
FIG. 4 is a diagram illustrating a map space provided by a server according to an embodiment.

FIG. 4 is a diagram illustrating a map space provided by a server according to an embodiment.

Referring to FIG. 4, the server 1100 may provide a virtual map space 400 in which a plurality of avatars corresponding to a plurality of user terminals may freely move. For example, a first avatar 420, a second avatar 430, and a third avatar 440 corresponding to the plurality of user terminals 1200 to 1220, respectively, may freely move in the map space 400. The server 1100 may control the behaviors of the first avatar 420, the second avatar 430, and the third avatar 440 based on input signals received from the plurality of user terminals 1200 to 1220, respectively. For example, the user of the user terminal may perform push, tap, touch-and-hold, double tap, drag, panning, flick, drag-and-drop, etc. to transmit an input signal to the server 1100.

For example, the map space 400 may include an audio space 410, which may correspond to a space in which a call between user terminals may be freely performed.

Referring back to FIG. 2, in operation 230, the server 1100 may mediate a call among the plurality of terminals including the first user terminal and the second user terminal, based on whether the plurality of avatars including the first avatar and the second avatar has entered the audio space 410 included in the map space.

Figure 5:
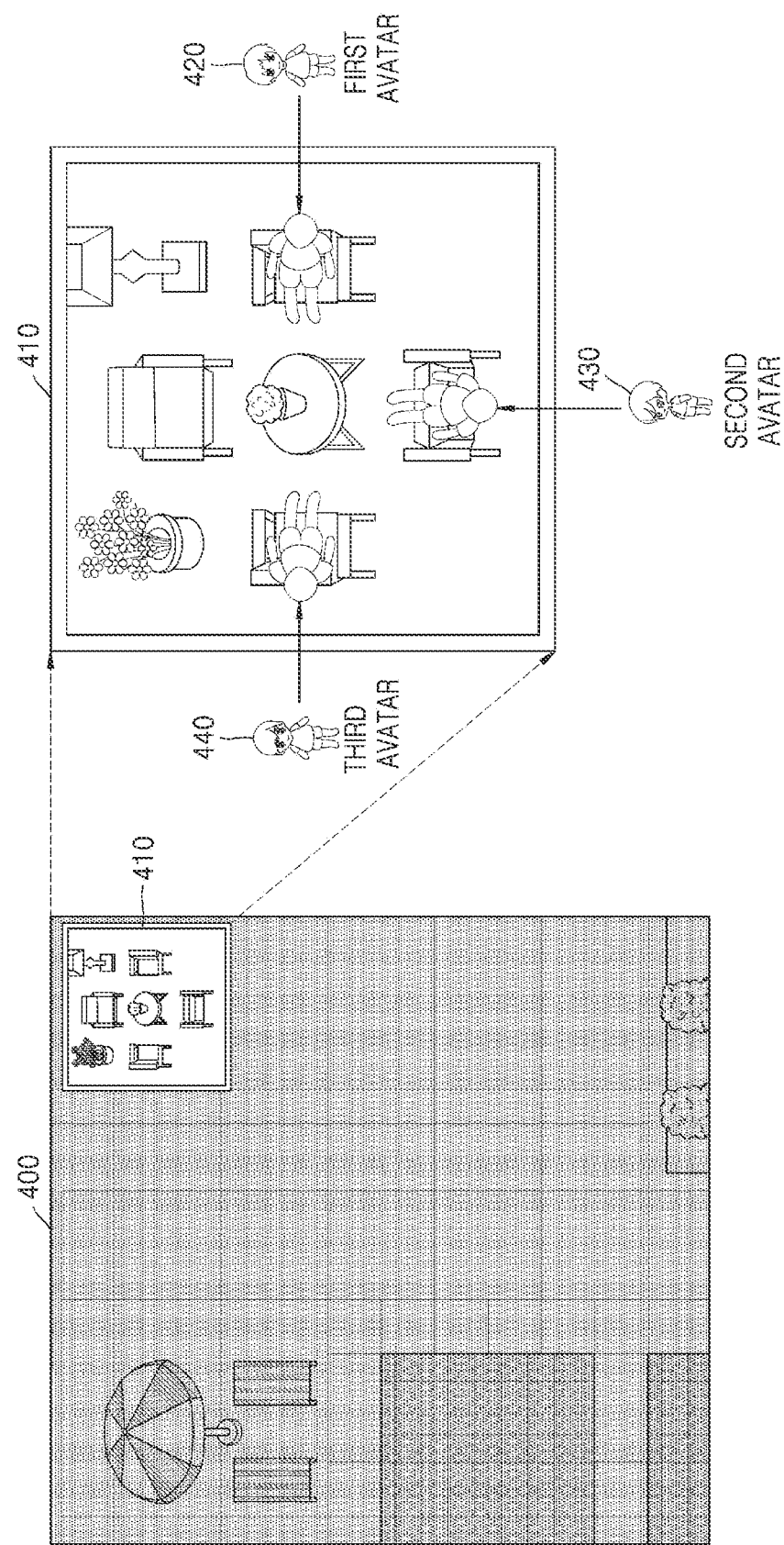
FIG. 5 is a diagram illustrating an example in which a plurality of avatars has entered an audio space included in a map space, according to an embodiment.

FIG. 5 is a diagram illustrating an example in which a plurality of avatars has entered an audio space included in a map space, according to an embodiment.

Referring to FIG. 5, the first avatar 420, the second avatar 430, and the third avatar 440 may enter the audio space 410 based on input signals received from the plurality of user terminals 1200 to 1220, respectively.

For example, when the user of the first user terminal 1200 wants to perform a call with at least one of the other user terminals, the first user terminal 1200 may transmit, to the server 1100, an input signal related to the behaviors of the first avatar 420. The server 1100 may control the first avatar 420 to enter the audio space 410 based on the input signal.

When the first avatar 420 enters the audio space 410, the server 1100 may control a microphone function of the first user terminal 1200 to be activated. When the microphone function of the first user terminal 1200 is activated, the first user terminal 1200 may perform a call with other user terminals present in the audio space 410.

For example, when a plurality of avatars including the second avatar 430 and the third avatar 440 has entered the audio space 410, the first user terminal 1200 may perform a call with a plurality of user terminals including the second user terminal 1210 and the third user terminal 1220. For example, the call may correspond to a video call or a voice call performed by a group of a plurality of user terminals.

In addition, when the first avatar 420 enters the audio space 410, the server 1100 may control the other regions of the map space 400 than the audio space 410 to be darkened on the screen of the first user terminal 1200.

Meanwhile, in an embodiment, the server 1100 may set an entry condition to enter the audio space 410. The entry condition set by the server 1100 for the plurality of avatars to enter the audio space 410 may include at least one of a condition regarding the ages of the avatars to enter the audio space 410, a condition regarding the gender ratio of the avatars present in the audio space 410, and a condition regarding the number of avatars present in the audio space 410.

For example, when the condition regarding the ages of the avatars to enter the audio space 410 is "The ages of the avatar should be 20 or greater", only avatars, the ages in the profiles of which are 20 or greater, may be permitted to enter the audio space 410.

Alternatively, for example, when the condition regarding the gender ratio of the avatars present in the audio space 410 is "The gender ratio should be 1:1", and the number of avatars, the gender in the profile of which is male, is greater than the number of avatars, the gender in the profile of which is female, among the avatars present in the audio space 410, a male avatar may not be permitted to enter the audio space 410.

Alternatively, for example, when the condition regarding the number of avatars present in the audio space 410 is "The total number of avatars should be 8 or less", and the number of avatars present in the audio space 410 is 8, any avatar may not be permitted to enter the audio space 410. For example, a condition regarding the number of avatars present in each of a plurality of audio spaces including the audio space 410 in the map space 400 may be preset.

Figure 6A:
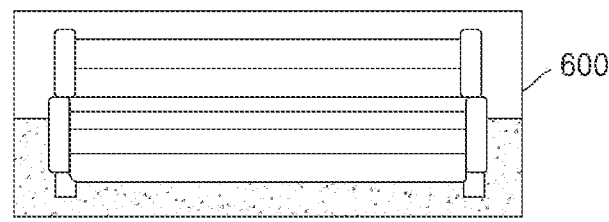
FIGS. 6A-C are diagrams illustrating various forms of audio spaces, according to an embodiment.
Figure 6B:
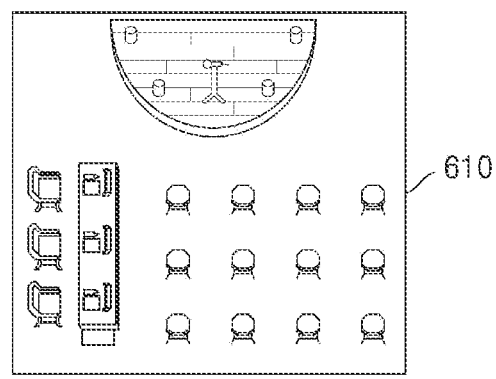
Figure 6C:
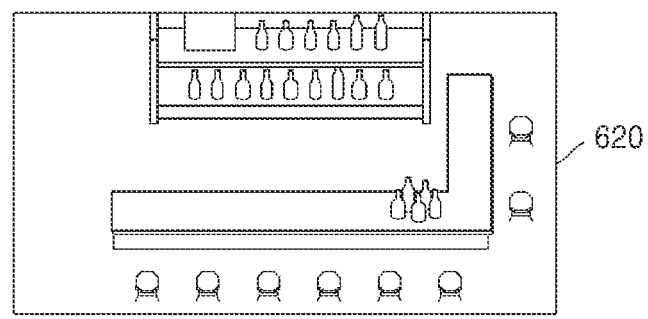

FIG. 6 is a diagram illustrating various forms of audio spaces, according to an embodiment.

Referring to FIG. 6, audio spaces are not limited to that illustrated in FIG. 5 and may have various forms.

For example, referring to (a) of FIG. 6, an audio space 600 may be in the form of a bench. The bench-type audio space may correspond to a space in which only a pair of user terminals may perform a call with each other, but is not limited thereto.

Alternatively, referring to (b) of FIG. 6, an audio space 610 may correspond to the form of a stage, and user terminals may perform busking, rap battling, singing competition, etc. in the stage-type audio space, but the present disclosure is not limited thereto.

Alternatively, referring to (c) of FIG. 6, an audio space 620 may correspond to the form of a bar, and a plurality of user terminals may perform a call in the bar-type audio space, but the present disclosure is not limited thereto.

Figure 7:
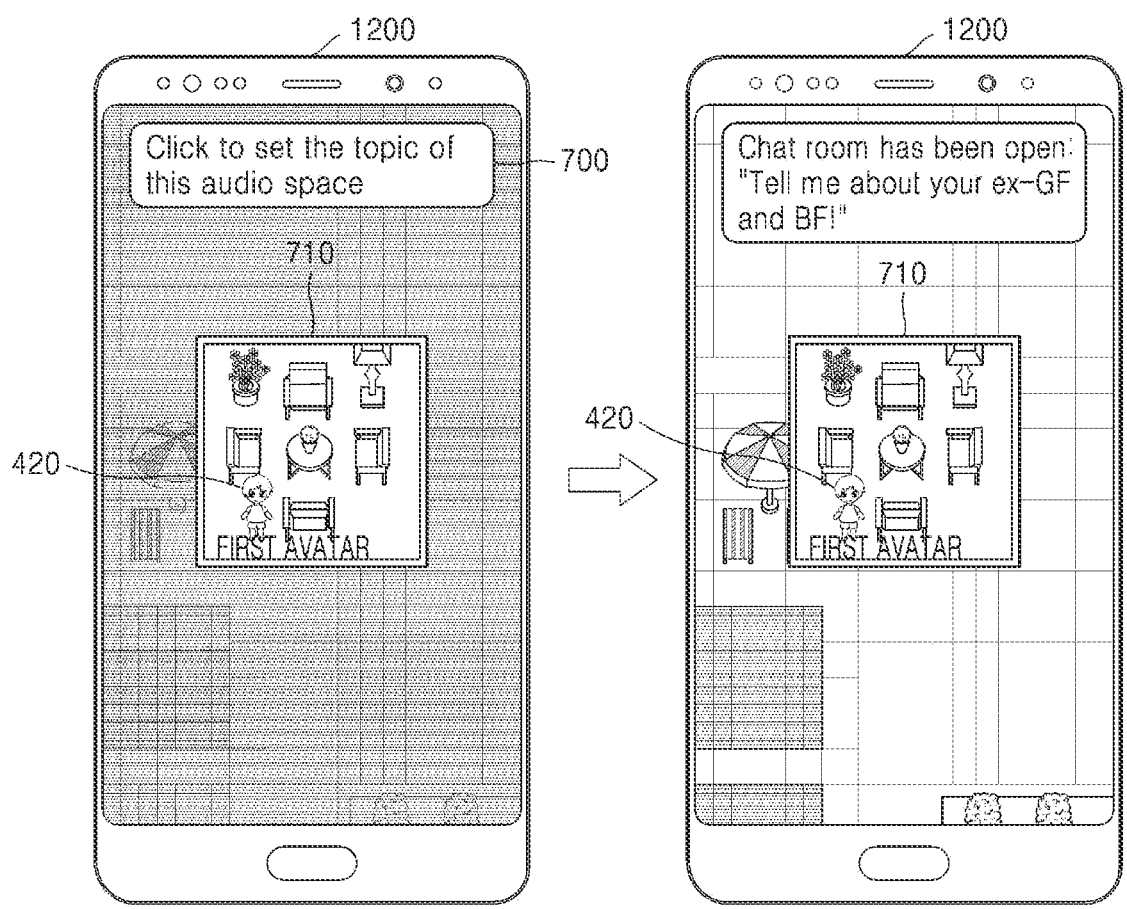
FIG. 7 is a diagram illustrating an example of a topic-settable audio space according to an embodiment.

FIG. 7 is a diagram illustrating an example of a topic-settable audio space according to an embodiment.

In an embodiment, an audio space 710 may correspond to a topic-settable audio space. For example, the audio space 710 may correspond to an audio space, the topic of which for user terminals present therein to talk about is settable.

The topic-settable audio space 710 may be distinguished from a topic-unsettable audio space. For example, in the topic-unsettable audio space 710, a dedicated component, such as a flag, a banner, or a blackboard, may be indicated to inform users that the topic is settable.

A window showing the topic of the audio space 710 may be displayed inside or outside the audio space 710, and may be displayed not only to users present in the audio space 710 but also to users outside the audio space 710. The topic of the audio space 710 may be included in a list of the topics of various audio spaces included in the map space, to be delivered to user terminals present in the map space. Alternatively, the topic of the audio space 710 may be delivered in the form of a pop-up message to the user terminals present in the map space.

Referring to FIG. 7, for example, when the first avatar 420 corresponding to the first user terminal 1200 enters the audio space 710, the topic of which is not yet set, a message window 700 for requesting to set the topic of the audio space 710 may be displayed on the screen of the first user terminal 1200. When the user of the first user terminal 1200 sets the topic of the audio space 710, a message window showing the topic of the audio space 710 may be displayed outside the audio space 710.

An interface for setting the topic of the audio space 710 may be provided to a user present in the audio space 710, the topic of which is not yet set. The user present in the audio space 710, the topic of which is not yet set, may set the topic of the audio space 710 by using the topic setting interface. Options for topic selection may be provided to the user who intends to set the topic of the audio space 710. For example, when the user enters the interface for setting the topic of the audio space 710, preset topic options may be displayed.

Meanwhile, after the first user terminal 1200 sets the topic of the audio space 710, other user terminals entering the audio space 710 may change the topic of the audio space 710. However, the topic of the audio space 710 may be unchangeable until a preset period of time (e.g., 10 seconds) elapses after the topic is set.

The topic of the audio space 710 may be maintained for a period of time (e.g., 10 minutes). In the audio space 710, the period of time that has elapsed since the current topic was set may be displayed. When the duration of the topic of the audio space 710 has elapsed, the topic may be re-initialized. When the topic of the audio space 710 is re-initialized, a topic setting interface may be provided to users present in the audio space 710 to set a new topic.

Figure 8:
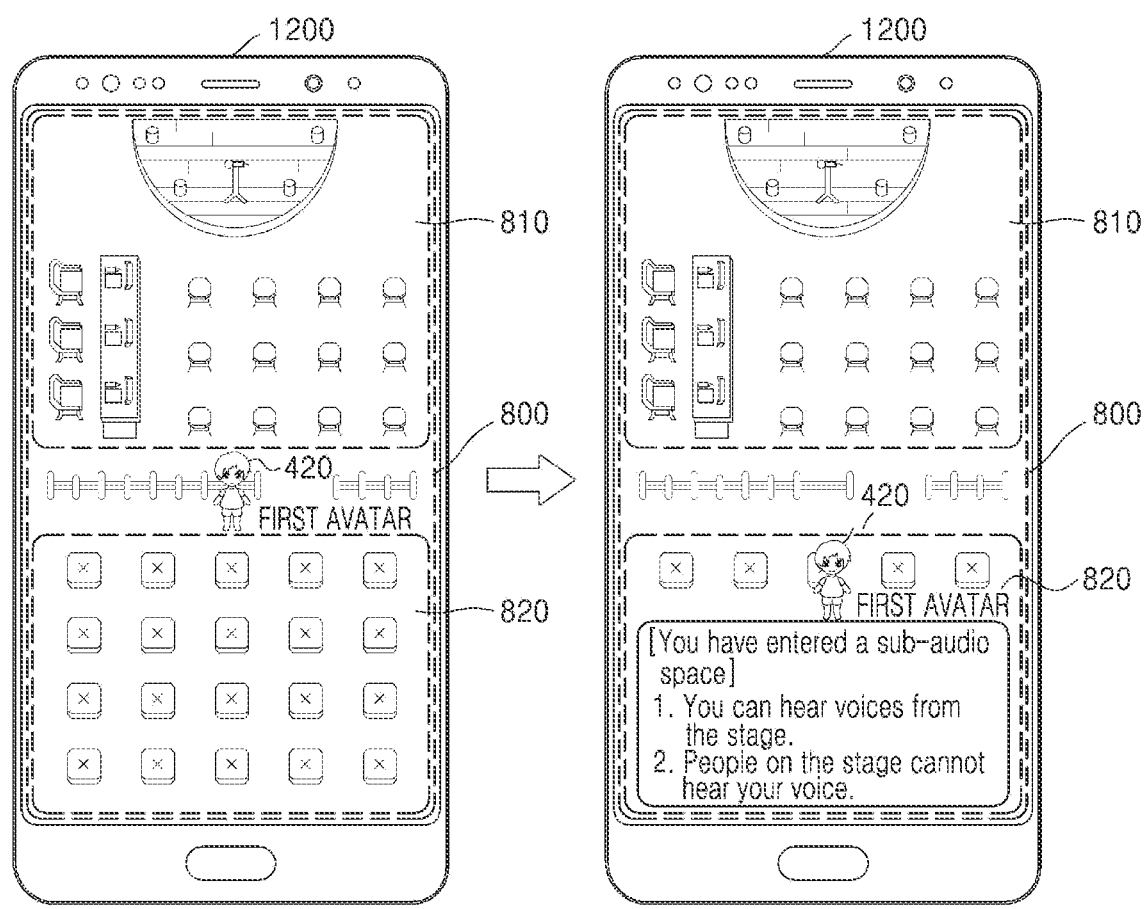
FIG. 8 is a diagram illustrating an example of a mirroring-enabled audio space according to an embodiment.

FIG. 8 is a diagram illustrating an example of a mirroring-enabled audio space according to an embodiment.

In an embodiment, an audio space 800 may correspond to a mirroring-enabled audio space. For example, the audio space 800 may include a main audio space 810 and a sub-audio space 820, and voices from a call between user terminals present in the main audio space 810 may be directly transmitted to user terminals present in the sub-audio space 820.

For example, voices from a call between user terminals present in the sub-audio space 820 may not be transmitted to user terminals present in the main audio space 810, and only voices from a call between the user terminals present in the main audio space 810 may be transmitted to the user terminals present in the sub-audio space 820.

For example, when the first avatar 420 corresponding to the first user terminal 1200 enters the sub-audio space 820, a message window may be displayed on the screen of the first user terminal 1200, for indicating that voices spoken in the main audio space 810 is audible in the sub-audio space 820 but voices spoken in the sub-audio space 820 is inaudible in the main audio space 810.

Figure 9:
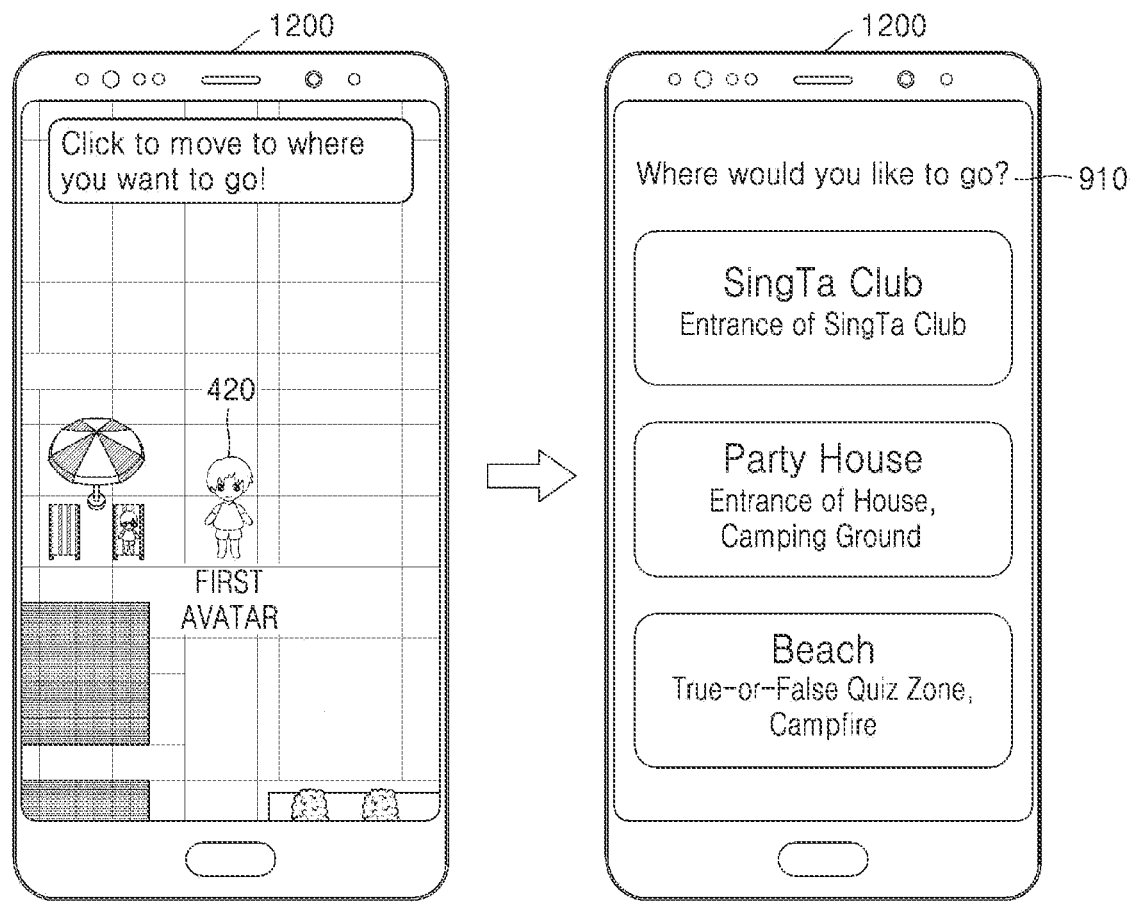
FIG. 9 is a diagram illustrating an example of teleportation in a map according to an embodiment.

FIG. 9 is a diagram illustrating an example of teleportation in a map according to an embodiment.

In an embodiment, a map space may include at least one sub-map space. The user may access the sub-map space by moving the avatar to the entrance of the sub-map space in the map space. For example, the sub-map space may correspond to "Building". By the user moving the avatar through the entrance of the sub-map space into the sub-map space, the user may be provided with an experience of entering into a "Building". Like the map space, the sub-map space may include an audio space. The user may perform, in a sub-map space, all of the above-described operations (e.g., transmitting a sign of attraction) that may be performed in a map space.

For example, referring to FIG. 9, a message and/or a button may be displayed on the screen of the first user terminal 1200, for indicating that a function of teleporting the avatar to a location desired by the user of the user terminal is available. When an input signal for selecting the message and/or button is received from the first user terminal 1200, the server 1100 may display, on the screen of the first user terminal 210, a list of locations to which the first avatar 420 corresponding to the first user terminal 1200 may be teleported. For example, the locations in the list may include a location around the entrance of a particular sub-map space, a location around an audio space having a particular topic set therefor, and/or a location inside a particular sub-map space.

For example, when an input signal for selecting one of the locations included in the list is received from the first user terminal 1200, the server 1100 may teleport the first avatar 420 to the corresponding location.

Meanwhile, in an embodiment, the sub-map space may correspond to a space configured based on information about the real-world locations of user terminals. The at least one sub-map space may include a first sub-map space, a second sub-map space, and the like, and for example, the first sub-map space may correspond to a sub-map space that user terminals located in "Jongno-gu, Seoul" of the real space may enter, and the second sub-map space may correspond to a sub-map space that user terminals located in "Gangnam-gu, Seoul" of the real space may enter.

For example, the first user terminal 1200 may transmit, to the server 1100, information about the current real-world location of the user of the first user terminal 1200 by using a GPS module included in the user terminal. The server 1100 may verify whether the first user terminal 1200 is present in a real-world location corresponding to a particular sub-map space, and, when the verification is successfully completed, allow the first avatar 420 to enter the sub-map space.

Referring back to FIG. 2, in operation 240, when the first user terminal transmits a first sign of attraction to the second avatar and the second user terminal transmits a second sign of attraction to the first avatar, the server 1100 may complete matching between the first user terminal and the second user terminal.

For example, as described above with reference to FIG. 3, the user of the second user terminal 1210 may click an attraction icon on profile information of the first user terminal 1200 to transmit a sign of attraction to the first avatar. Similarly, the user of the first user terminal 1200 may click an attraction icon on profile information of the second user terminal 1210 to transmit a sign of attraction to the second avatar, based on a call. In this case, the server 1100 may complete matching between the first user terminal 1200 and the second user terminal 1210.

Figure 10:
FIG. 10 is a diagram illustrating an example in which matching between a first user terminal and a second user terminal is completed, according to an embodiment.

FIG. 10 is a diagram illustrating an example in which matching between a first user terminal and a second user terminal is completed, according to an embodiment.

In an embodiment, when the matching between the first user terminal 1200 and the second user terminal 1210 is completed, the server 1100 may mediate transmission and reception of messages between the first user terminal 1200 and the second user terminal 1210.

FIG. 10 illustrates an example of a screen displayed on the display of the second user terminal 1210 when the matching between the first user terminal 1200 and the second user terminal 1210 is completed.

Referring to FIG. 10, when the matching between the first user terminal 1200 and the second user terminal 1210 is completed, the server 1100 may display, on the second user terminal 1210, a message window indicating that a message may be transmitted to the first avatar corresponding to the first user terminal 1200. Similarly, a message window indicating that a message may be transmitted to the second avatar corresponding to the second user terminal 1210 may be displayed on the display of the first user terminal 1200. The server 1100 may mediate transmission and reception of messages between the first user terminal 1200 and the second user terminal 1210.

When the matching between the first user terminal 1200 and the second user terminal 1210 is completed, the server 1100 may display, on the screens of the user terminals present in the map space, a pop-up message window indicating that the matching between the first user terminal 1200 and the second user terminal 1210 is completed.

Figure 11:
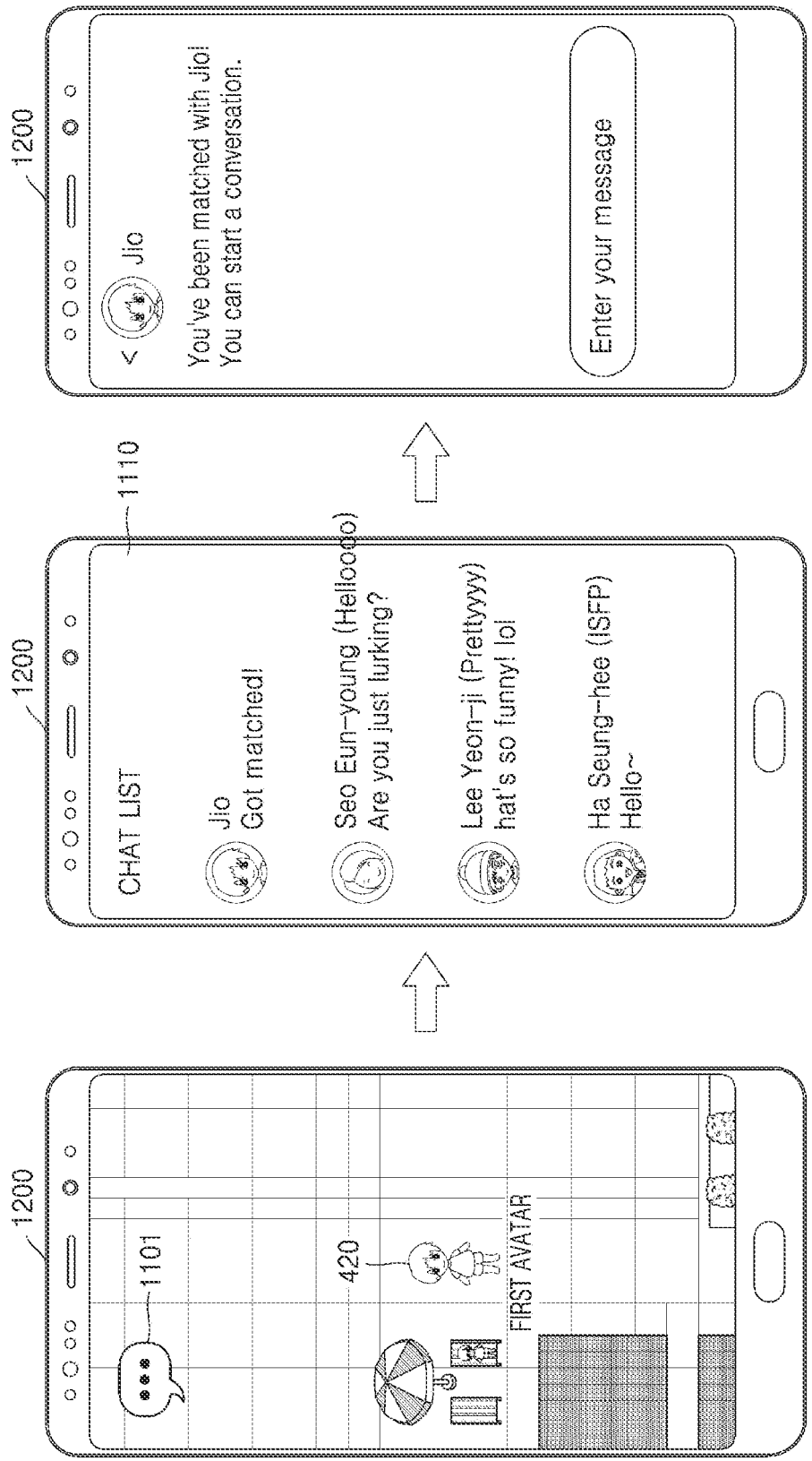
FIG. 11 is a diagram illustrating an example of transmission and reception of messages between user terminals, according to an embodiment.

FIG. 11 is a diagram illustrating an example of transmission and reception of messages between user terminals, according to an embodiment.

In an embodiment, on the screen of the user terminal present in the map space, a button for transmitting and receiving messages to and from other user terminals that are completely matched with the user terminal may be displayed.

Referring to FIG. 11, for example, on the screen of the first user terminal 1200, a button 1101 for transmitting and receiving messages to and from user terminals that are completely matched with the first user terminal 1200 may be displayed. When an input signal for selecting the button 1101 displayed on the screen is received from the first user terminal 1200, the server 1100 may display, on the screen of the first user terminal 1200, a chat list 1110 including chats with user terminals that have been completely matched with the first user terminal 1200 or a chat with a user terminal that is newly completely matched with the first user terminal 1200. For example, the chat list 1110 may include a history of messages transmitted and received to and from each of the user terminals that are completely matched with the first user terminal 1200.

In addition, when an input signal for selecting, from the chat list 1110, the chat with the user terminal that is newly matched with the first user terminal 1200 is received from the first user terminal 1200, the server 1100 may display, on the screen of the first user terminal 1200, a chat window for transmitting and receiving message to and from the newly matched user terminal.

Figure 12:
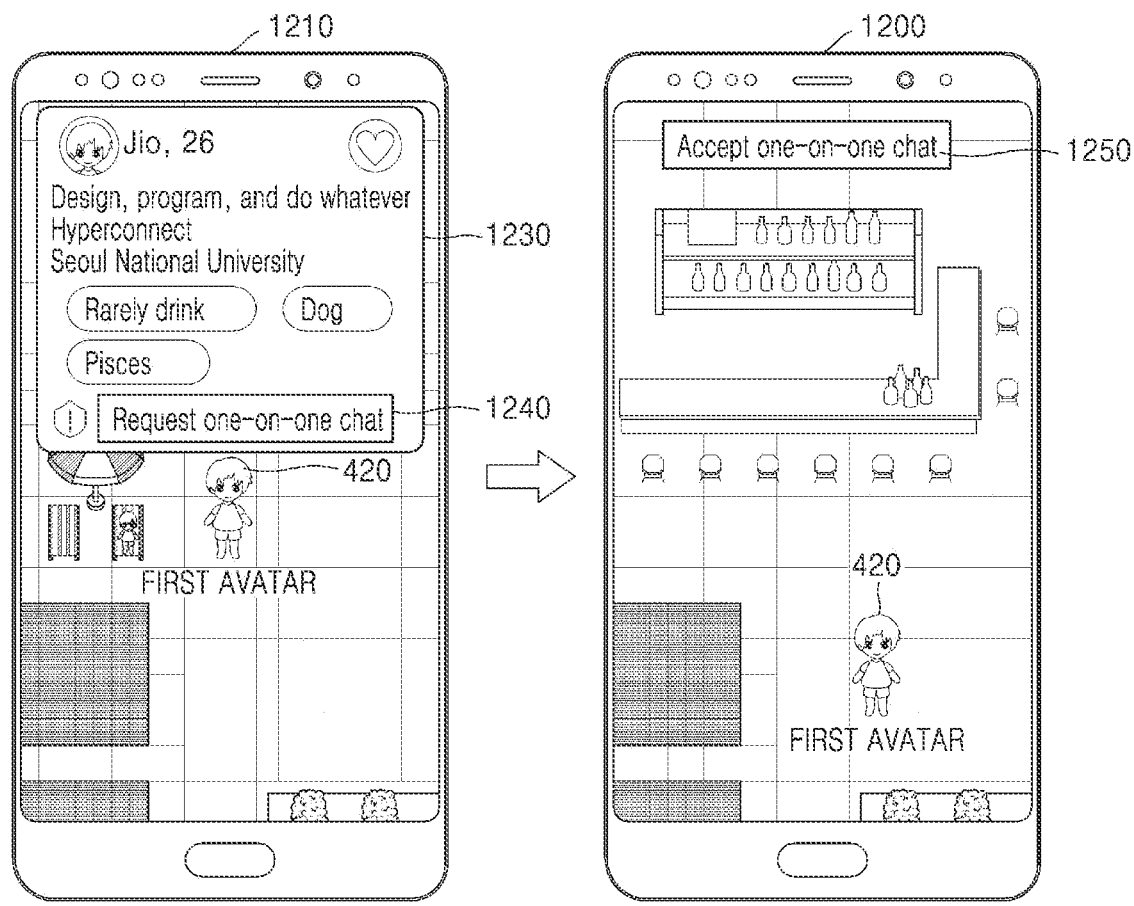
FIG. 12 is a diagram illustrating an example of a screen for a one-on-one chat between a first user terminal and a second user terminal, according to an embodiment.

FIG. 12 is a diagram illustrating an example of a screen for a one-on-one chat between a first user terminal and a second user terminal, according to an embodiment.

In an embodiment, when a request and acceptance for a one-on-one chat between the first user terminal 1200 and the second user terminal 1210 are completely made, the server 1100 may control the first user terminal 1200 and the second user terminal 1210 to enter a second audio space and perform the one-on-one chat.

Referring to FIG. 12, when the user of the second user terminal 1210 clicks an object representing the first avatar 420 or a nickname displayed on the object, the second user terminal 1210 may receive profile information 1230 of the first user terminal 1200. In the profile information 1230 of the first user terminal 1200, an icon 1240 for requesting a one-on-one chat with the first user terminal 1200 may be displayed. The user of the second user terminal 1210 may click the icon 1240 for requesting a one-on-one chat.

Meanwhile, the maximum number of times that the user of the second user terminal 1210 is allowed to click an icon for requesting a one-on-one chat per day may be preset. For example, when the user of the second user terminal 1210 has clicked icons for requesting a one-on-one chat displayed in profile information of other user terminals the preset maximum number of times, and then clicks the icon 1240 for requesting a one-on-one chat, the first user terminal 1200 may not receive a request for a one-on-one chat with the second user terminal 1210.

When an input signal for clicking the icon 1240 for requesting a one-on-one chat is received from the second user terminal 1210, the server 1100 may display, on the screen of the first user terminal 1200, a button 1250 for accepting the one-on-one chat requested by the second user terminal 1210.

When an input signal for clicking the icon 1250 for accepting the one-on-one chat is received from the first user terminal 1200, the server 1100 may control the avatars corresponding to the first user terminal 1200 and the second user terminal 1210 to be teleported to the second audio space. The second audio space may correspond to a space that up to two avatars may enter and only a pair of user terminals may perform a chat. For example, the second audio space may be a space generated separately from the map space or may be a space included in the map space.

When the first avatar 420 corresponding to the first user terminal 1200 and the second avatar 430 corresponding to the second user terminal 1210 enter the second space, the server 1100 may mediate a chat between the first user terminal 1200 and the second user terminal 1210. For example, the server 1100 may mediate a video call or a voice call between the first user terminal 1200 and the second user terminal 1210, or may mediate transmission and reception of messages between the first user terminal 1200 and the second user terminal 1210 through a chat window. Also, the server 1100 may mediate a one-on-one chat between the first user terminal 1200 and the second user terminal 1210 for a preset period of time (e.g., 3 minutes). For example, when the preset period of time elapses, the server 1100 may terminate the one-on-one chat between the first user terminal 1200 and the second user terminal 1210. When the one-on-one chat between the first user terminal 1200 and the second user terminal 1210 is terminated, the server 1100 may teleport the avatars corresponding to the first user terminal 1200 and the second user terminal 1210 out of the second audio space to different arbitrary spaces in the map space. When the remaining period of time of the duration of the one-on-one chat between the first user terminal 1200 and the second user terminal 1210 in the second audio space is equal to a preset period of time (e.g., 30 seconds or 5 seconds), the server 1100 may notify the users of the remaining period of time and display a message for suggesting to send a sign of attraction to the counterpart within the remaining period of time. For example, when the remaining period of time of the duration of the one-on-one chat in the second audio space is equal to the preset period of time (e.g., 30 seconds or 5 seconds), the server 110 may display, on the first user terminal 1200 and the second user terminal 1210, a message, for example, "The chat will be terminated after 30 seconds! Send a heart and check your mate's feeling!" or "The chat will be terminated soon! Don't be surprised if you are moved to different locations!".

Figure 13:
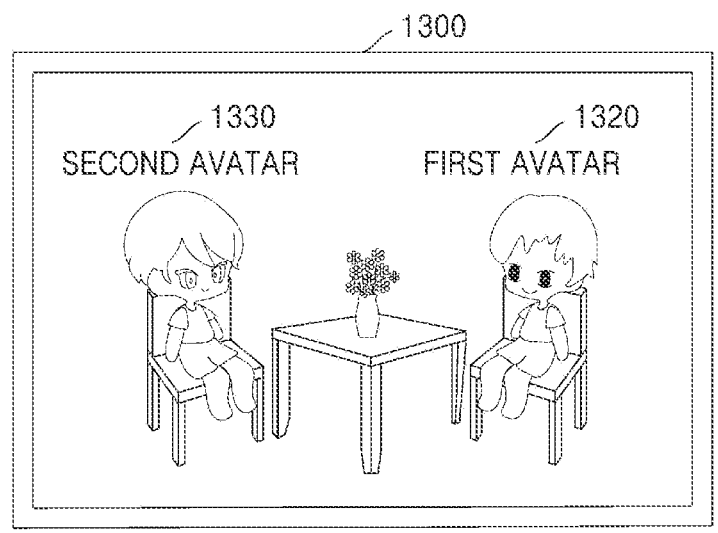
FIG. 13 is a diagram illustrating an example in which a pair of avatars enters a second space included in a map space, according to an embodiment.

FIG. 13 is a diagram illustrating an example in which that a pair of avatars enters a second space included in a map space, according to an embodiment.

Referring to FIG. 13, the first avatar 1320 and the second avatar 1330 may enter a second space 1300 based on input signals received from a pair of user terminals, respectively.

When the first avatar 1320 enters the second space 1300, the server 1100 may control the microphone function of the first user terminal 1200 to be activated. Similarly, when the second avatar 1330 enters the second space 1300, the server 1100 may control the microphone function of the second user terminal 1210 to be activated.

When the microphone functions of the first user terminal 1200 and the second user terminal 1210 are activated, the first user terminal 1200 and the second user terminal 1210 may perform a call.

Figure 14:
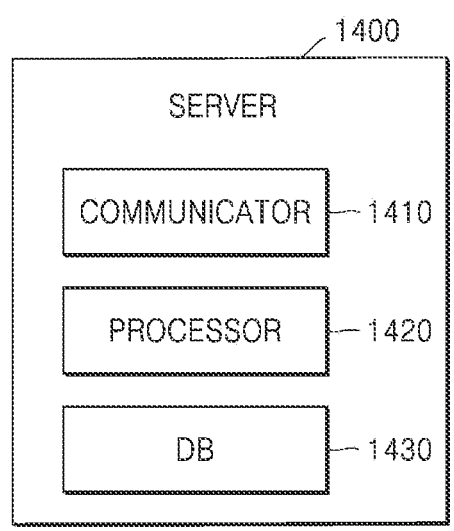
FIG. 14 is a block diagram of a server according to an embodiment.

FIG. 14 is a block diagram of a server according to an embodiment.

Referring to FIG. 14, a server 1400 may include a communicator 1410, a processor 1420, and a database (DB) 1430. The server 1400 of FIG. 14 may be the same as the server 1100 of FIG. 1. FIG. 14 illustrates only components of the server 1400, which are related to the embodiments. Therefore, it will be understood by one of skill in the art that the server 1400 may further include other general-purpose components in addition to the components illustrated in FIG. 14.

The communicator 1410 may include one or more components for enabling wired/wireless communication with a terminal. For example, the communicator 1410 may include at least one of a short-range wireless communication unit (not shown), a mobile communication unit (not shown), and a broadcast receiver (not shown).

The DB 1430 is a hardware unit for storing various pieces of data processed by the server 1400 and may store a program for operating and controlling of processor 1420.

The DB 1430 may include random-access memory (RAM) such as dynamic RAM (DRAM) or static SRAM, read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 1420 controls the overall operation of the server 1400. For example, the processor 1420 may execute programs stored in the DB 1430 to perform overall control on an input unit (not shown), a display (not shown), the communicator 1410, the DB 1430, and the like. The processor 1420 may execute the programs stored in the DB 1430 to control the operation of the server 1400.

The processor 1420 may be implemented by using at least one of application-specific integrated circuits (ASICs), digital signal processors (DSPs), digital signal processing devices (DSPDs), programmable logic devices (PLDs), field-programmable gate arrays (FPGAs), controllers, micro-controllers, microprocessors, and electrical units for performing other functions.

The server 1400 may communicate with at least one user terminal through the communicator 1410.

Various embodiments of the present disclosure may be implemented as software (e.g., a program) including one or more instructions stored in a machine-readable storage medium. For example, a processor of a machine may call and execute at least one instruction of the stored one or more instructions from the storage medium. This enables the machine to be operated to perform at least one function according to the called at least one instruction. The one or more instructions may include code generated by a compiler or code executable by an interpreter. The machine-readable storage medium may be provided in the form of a non-transitory storage medium. Here, the term 'non-transitory' merely means that the storage medium does not refer to a transitory electrical signal but is tangible, and does not distinguish whether data is stored semi-permanently or temporarily on the storage medium.

According to an embodiment, the method according to various embodiments disclosed herein may be included in a computer program product and provided. The computer program product may be traded between a seller and a purchaser as a commodity. The computer program product may be distributed in the form of a machine-readable storage medium (e.g., a CD-ROM), or may be distributed online (e.g., downloaded or uploaded) through an application store (e.g., Play Store™) or directly between two user devices. In the case of online distribution, at least a portion of the computer program product may be temporarily stored in a machine-readable storage medium such as a manufacturer's server, an application store's server, or a memory of a relay server.

Also, the terms described in the specification, such as "... er (or)", "... unit", "... module", etc., denote a unit that performs at least one function or operation, which may be implemented as hardware or software or a combination thereof.

The scope of the present disclosure is not defined by the detailed description of the present disclosure but by the following claims, and all modifications or alternatives derived from the scope and spirit of the claims and equivalents thereof fall within the scope of the present disclosure.

According to an embodiment of the present disclosure, user terminals, as avatars in a metaverse, may perform a call with other various user terminals while freely moving in a map space, and thus a probability of matching between user terminals may increase.

In addition, according to another embodiment of the present disclosure, it is possible to provide an experience of performing a call with various user terminals in a metaverse even before being completely matched with a particular user terminal.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An operating method of a server, the operating method comprising:
    generating a plurality of avatars based on profile information of a plurality of user terminals;
    providing a map space in which the plurality of avatars are able to travel;
    providing a first audio space, wherein the first audio space is a sub-map space located on the map space,
    wherein the providing of the first audio space comprises setting an entry condition for entering the first audio space,
    wherein the entry condition comprises at least one of a condition regarding ages of avatars to enter the first audio space, a condition regarding a gender ratio of avatars present in the first audio space, and a condition regarding a number of avatars present in the first audio space;
    identifying a first avatar generated based on a first user terminal and a second avatar generated based on a second user terminal from a plurality of avatars that entered into the first audio space by satisfying the entry condition;
    moving the identified first avatar and second avatar to a second audio space;
    in the second audio space, facilitating a conversation between the first user terminal and the second user terminal based on the identified first avatar and second avatar in the first audio space, wherein the conversation is a video call or a voice call; and
    matching a user of the first user terminal and a user of the second user terminal upon detecting a sign of attraction transmitted from the first user terminal to the second avatar and a sign of attraction transmitted from the second user terminal to the first avatar after the conversation,
    wherein the matching further comprises providing for transmission and reception of messages between the first user terminal and the second user terminal through chat windows.

2. The operating method of claim 1, wherein
    the matching further comprises adding the first user to a chat list on the second user terminal, and adding the second user to a chat list on the first user terminal.

3. The operating method of claim 1, wherein
    the map space comprises at least one sub-map space, and
    the at least one sub-map space corresponds to a space configured based on information about real-world locations of user terminals.

4. A non-transitory computer-readable recording medium having recorded thereon a program for executing the method of claim 1 on a computer.

5. The method of claim 1, wherein the identifying of the first avatar and second avatar is based on a request for the conversation in the second audio space made by either the first or the second avatar to either the first or second avatar.

6. The method of claim 1, wherein the second audio space comprises a sub-map space located on the map space.

7. An apparatus comprising:
    a memory storing at least one program; and
    at least one processor configured to execute the at least one program to:
        generate a plurality of avatars based on profile information of a plurality of user terminals;
        provide a map space in which the plurality of avatars are able to travel;
        provide a first audio space, wherein the first audio space is a sub-map space located on the map space,
        wherein the providing of the first audio space comprises setting an entry condition for entering the first audio space,
        wherein the entry condition comprises at least one of a condition regarding ages of avatars to enter the first_audio space, a condition regarding a gender ratio of avatars present in the first audio space, and a condition regarding a number of avatars present in the first audio space;
        identify a first avatar generated based on a first user terminal and a second avatar generated based on a second user terminal from a plurality of avatars that entered into the first audio space by satisfying the entry condition;
        move the identified first avatar and second avatar to a second audio space;
        in the second audio space, facilitate a conversation between the first user terminal and the second user terminal based on the identified first avatar and second avatar in the audio space, wherein the conversation is a video call or a voice call; and
        match a user of the first user terminal and a user of the second user terminal upon detecting a sign of attraction transmitted from the first user terminal to the second avatar and a sign of attraction transmitted from the second user terminal to the first avatar after the conversation,
    wherein the processor is further configured to execute the at least one program to provide for transmission and reception of messages between the first user terminal and the second user terminal through chat windows.

8. The apparatus of claim 7, wherein the processor is further configured to execute the at least one program to add the first user to a chat list on the second user terminal and add the second user to a chat list of the first user terminal.

9. The apparatus of claim 7, wherein
    the map space comprises at least one sub-map space, and
    the at least one sub-map space corresponds to a space configured based on information about real-world locations of user terminals.

10. The apparatus of claim 7, wherein the identifying of the first avatar and second avatar is based on a request for the conversation in the second audio space made by either the first or the second avatar to either the first or second avatar.

11. The apparatus of claim 7, wherein the second audio space comprises a sub-map space located on the map space.

\* \* \* \* \*